United States Patent [19]

Glennon

[11] Patent Number: 5,200,873
[45] Date of Patent: Apr. 6, 1993

[54] CIRCUIT INTERRUPTER
[75] Inventor: Oliver Glennon, Ballinasloe, Ireland
[73] Assignee: Square D Company, Palatine, Ill.
[21] Appl. No.: 624,797
[22] Filed: Dec. 5, 1990
[51] Int. Cl.[5] .......................... H02H 3/26; H02H 3/28
[52] U.S. Cl. ........................................ 361/45; 361/49
[58] Field of Search ............... 361/42, 45, 49, 102, 361/46, 187, 170, 160, 159

[56] References Cited

U.S. PATENT DOCUMENTS

| | | | |
|---|---|---|---|
| 4,001,648 | 1/1977 | Taketa et al. | 361/42 |
| 4,020,394 | 4/1977 | Potash | 361/45 |
| 4,068,276 | 1/1978 | Pintell | 361/46 |
| 4,091,431 | 5/1978 | Morris | 361/45 |
| 4,578,731 | 3/1986 | Andriessen et al. | 361/42 |
| 4,598,331 | 7/1986 | Legatti | 361/46 |
| 4,931,893 | 5/1990 | Glennon et al. | 361/45 |
| 4,994,933 | 2/1991 | Matsuoka | 361/42 |

Primary Examiner—A. D. Pellinen
Assistant Examiner—Ronald W. Leja
Attorney, Agent, or Firm—Larry I. Golden; Kareem M. Irfan

[57] ABSTRACT

A circuit interrupter is disclosed which provides for tripping of a line lead on occurrence of a loss of neutral or an earth leakage fault without the need for an earth connection. The circuit interrupter includes a circuit breaker which is activated by discharge of a capacitor in a closed loop, the capacitor being connected across the output of a D.C. power supply. A loss of neutral fault is detected as the potential of a neutral lead rises through a pull-up resistor and tripping will occur before the neutral rises to a potential at which the power supply becomes inoperative.

6 Claims, 2 Drawing Sheets

CIRCUIT INTERRUPTER

BACKGROUND OF THIS INVENTION

1. Field of the Invention

The present invention relates to a circuit interrupter for an electrical distribution system.

2. Related Prior Art

Presently available electronic circuit interrupters generally operate on D.C. power and thus require a power supply connected at the input to line and neutral leads of an electrical distribution system. In many cases, in the event of opening of the neutral lead, the D.C. output is lost and the circuit interrupter is rendered inoperative. This problem has been overcome in the circuit interrupters described in British Patent Specification No. 2,000,398 (Hazemeyer) and U.S. Pat. No. 4,598,331 (Legatti) by use of an earth terminal or lead. In these arrangements, the earth lead is connected to the power supply to take over the function of the neutral lead if the latter becomes open. The earth lead also completes a path for activating current of a circuit breaker in the circuit interrupter.

While these arrangements may be suitable where earth leads are readily available, they are not satisfactory where an earth lead may not be available such as in double insulation equipment.

In an effort to provide continuing fault protection in the event of loss of neutral where an earth lead is not available, circuit interrupters have been devised having a circuit breaker which is normally activated and is de-activated when a fault occurs. This arrangement, however, suffers from the disadvantages that tripping will occur if the line voltage becomes low or absent and will fail to detect reversal of the line and neutral leads.

SUMMARY OF THE INVENTION

According to the invention there is provided a circuit interrupter for use in a system having line and neutral leads between an energy source and a load, the circuit interrupter including a circuit breaker in the line lead. The circuit breaker is activated by a tripping circuit when a fault detection circuit detects a fault in the system. The tripping circuit comprises a D.C. power supply fed by the line and neutral leads, the output of which, in addition to providing a D.C. power for the circuit interrupter generally, maintains a charge storage device in a charged state. The charge storage device is connected in a closed loop, which includes the circuit breaker and a switch to the power supply. The switch is normally open, however, it may be closed by a switch control circuit forming part of the tripping circuit on detection of a fault in the system. When the switch is closed, the charge storage device discharges in the closed loop thus activating the circuit breaker.

The fault detection circuit may be of the differential current transformer type for detection of earth leakage. Instead of or, in addition, there may be a fault detection circuit for loss of neutral. If there is a second fault detection circuit, the closed loop may be completed by either of a pair of switches connected in parallel, one for earth leakage, and the other for loss of neutral.

Ideally, the loss of neutral detection circuit includes a pull-up resistor between the neutral and line leads so that potential of the neutral lead rises on opening thereof. In this embodiment, the loss of neutral detection circuit preferably comprises an electro-magnetic detector for detection of an electro-magnetic field generated around the neutral lead when the neutral potential rises.

An object of the invention is to provide a circuit interrupter which provides fault protection without a requirement for an earth lead. Another object is to ensure that tripping does not occur if line voltage becomes low or absent.

A further object is that the circuit interrupter detects reversal of line and neutral connections.

Another object is that the circuit breaker trips in the event of loss of neutral.

BRIEF DESCRIPTION OF THE DRAWINGS

The invention will be more clearly understood from the following description of some preferred embodiments thereof, given by way of example only with reference to the accompanying drawings in which.

DETAILED DESCRIPTION OF THE PREFERRED EMBODIMENTS

Figure 1:
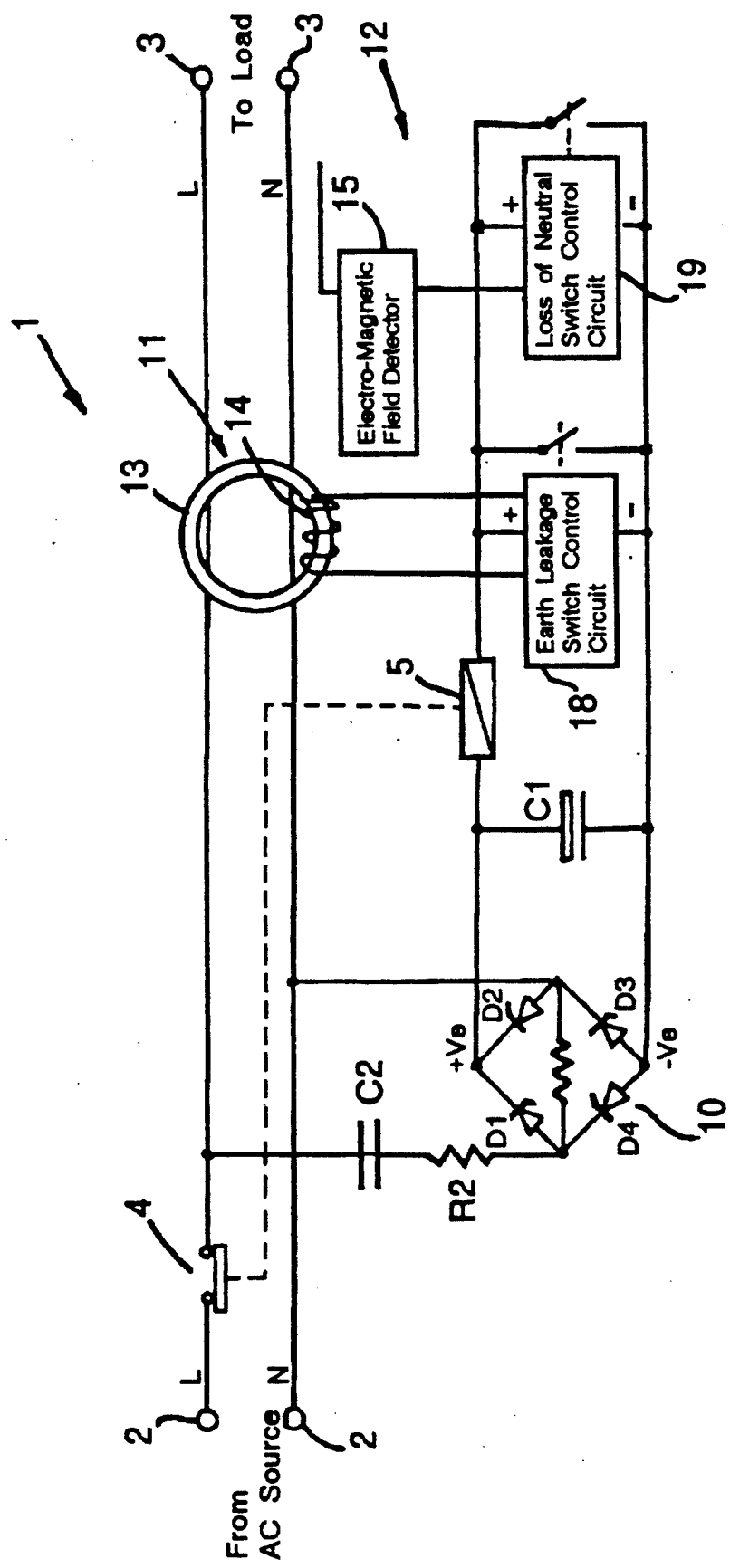
FIG. 1 is an outline schematic representation of a circuit interrupter of the invention.

Referring to the drawings, and initially to FIG. 1 there is illustrated a circuit interrupter of the invention, indicated generally by the reference numeral 1. The circuit interrupter 1 comprises a line lead L, a neutral lead N, line terminals 2 and load terminals 3 for connection in an A.C. electrical distribution system. A circuit breaker comprising contacts 4 and a solenoid 5 is arranged for disconnection of the line lead L on detection of a fault. The circuit interrupter 1 also includes a power supply in the form of a full-wave rectifier 10 having diodes D1, D2, D3 and D4. A capacitor C1 is connected across the output of the full-wave rectifier 10. The input of the rectifier 10 is connected to the line lead L via a D.C. isolation capacitor C2 and a resistor R1, and to the neutral lead N.

The circuit interrupter 1 includes two fault detection circuits, namely an earth leakage detection circuit 11 and a loss of neutral detection circuit 12. The earth leakage detection circuit 11 comprises a differential current transformer 13 for which the line and neutral leads are connected as opposed primary windings. A secondary winding 14 is arranged for detection of imbalance in the transformer 13.

The loss of neutral detection circuit 12 comprises a pull-up resistor R2 connected between the line and neutral input terminals of the full-wave rectifier 10. An electro-magnetic field detector 15 is arranged for detection of an electro-magnetic field caused by changing voltage in the neutral lead N, which is in turn caused by rising neutral potential through the pull-up resistor R2 on loss of neutral.

The circuit interrupter 1 also includes a tripping circuit for activation of the circuit breaker on detection of an earth leakage fault or a loss of neutral fault. The full-wave rectifier 10 acts to both provide D.C. power for the circuit interrupter 1 and to form part of the tripping circuit. The tripping circuit includes the capacitor C1 connected across the output of the full-wave rectifier 10, and a closed loop in which the capacitor C1 is connected. The closed loop is completed by the circuit breaker solenoid 5 and a pair of switches connected in parallel namely, an earth leakage switch 16 and a loss of neutral switch 17. The earth leakage switch 16 is controlled by an earth leakage switch control circuit 18 which is connected to the secondary winding 14. The loss of neutral switch 17 is controlled by a loss of neutral switch control circuit 19 which is connected to the electro-magnetic field detector 15.

In operation, the circuit breaker contacts 4 are closed and A.C. power is delivered to a load via the load terminals 3.

Meanwhile, the full-wave rectifier 10 provides D.C. power for the circuit interrupter 1. The capacitor C1 acts to both smooth the output of the full-wave rectifier 10 and as a charge storage device for the tripping circuit. The switches 16 and 17 are normally in the open positions so that the capacitor C1 stores charge. If an earth leakage fault develops, there will be an imbalance detected in the differential current transformer 13 and a voltage appears across the secondary winding 14. This voltage is detected at the earth leakage switch control circuit 18 which closes the switch 16, causing the capacitor C1 to discharge in the closed loop through the solenoid 5, thereby activating the circuit breaker.

On loss of neutral, such as a faulty terminal contact or an opening of the neutral lead in the electrical distribution system, the potential of the neutral lead N will rise to that of the line lead L through the pull-up resistor R2. This results in generation of an electro-magnetic field around the neutral lead N while the increase is taking place. The electro-magnetic field is detected by the detector 15 which transmits a signal to the loss of neutral switch control circuit 19. The loss of neutral switch 17 is then closed, again allowing the capacitor C1 to discharge through the solenoid 5, thereby activating the circuit breaker.

The detector 15 is arranged to detect an electro-magnetic field arising from a relatively small rise in neutral lead potential so that tripping will occur before C1 becomes discharged.

Figure 2:
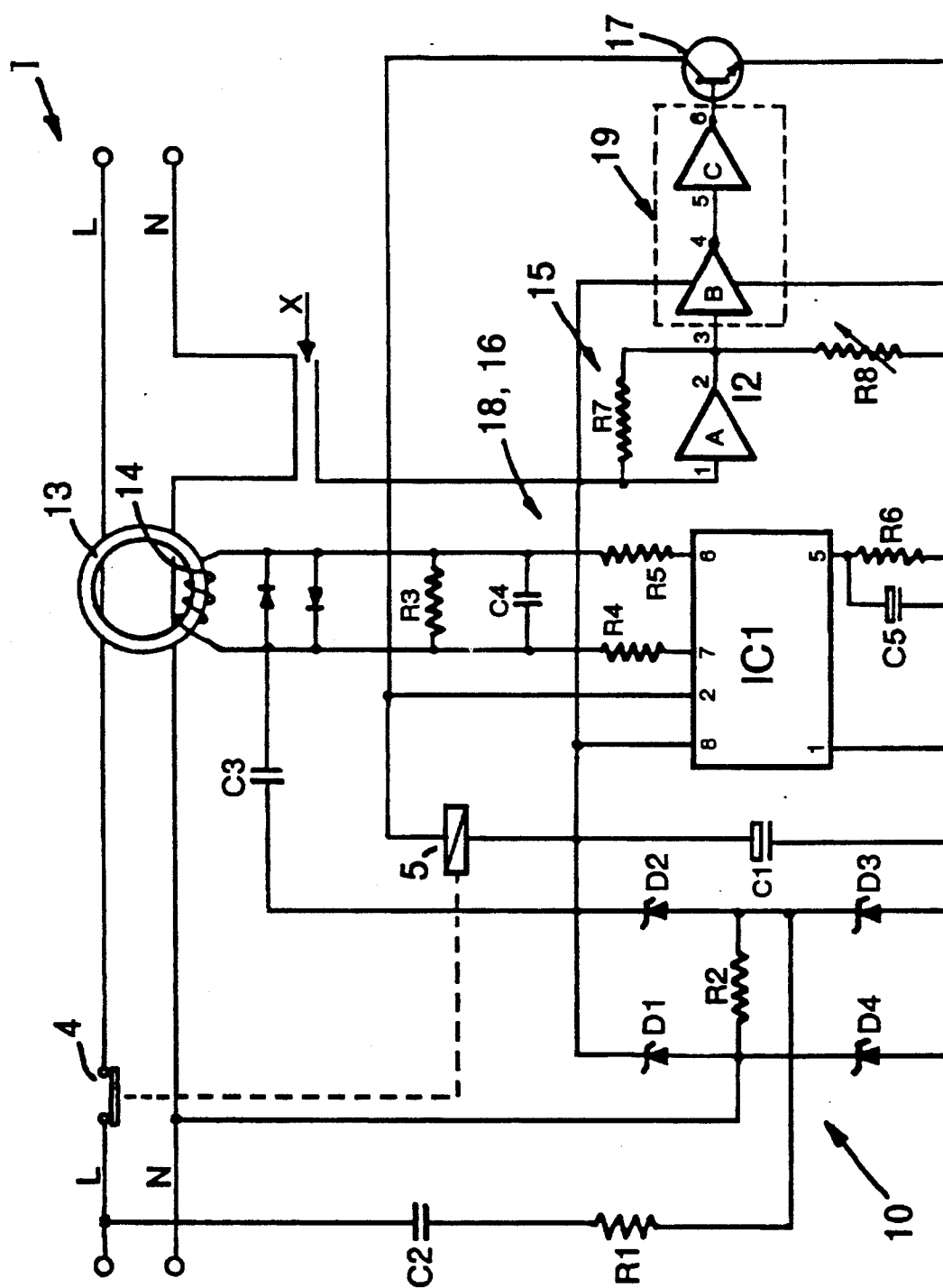
FIG. 2 is a more detailed diagram of one embodiment of the circuit interrupter of the present invention.

Referring now to FIG. 2, the circuit interrupter 1 is illustrated in more detail. The earth leakage switch control circuit 18 includes various diodes, capacitors and resistors for improved signal definition and an integrated circuit IC1 which incorporates the earth leakage switch 16. Thus, the closed loop is completed on detection of an earth leakage fault by a short-circuit between pin 2 and pin 1 of the integrated circuit IC1. The loss of neutral detection and switch control circuits are formed by an integrated circuit IC2, pin 1 of which is arranged for detection of the electro-magnetic field. The integrated circuit IC2 is a hex inverter having stages A, B and C. Stage A includes a feed-back resistor R7 for linear amplification of changes in the electro-magnetic field at position X of the neutral lead N. A variable resistor R8 sets the point at which the output from the stage A triggers the stages B and C. The loss of neutral switch 17 is a bipolar transistor, the base of which is triggered by pin 6 of the integrated circuit IC2.

It will be appreciated that the circuit interrupter of the invention provides a tripping function both on detection of loss of neutral and on detection of earth leakage. This function is achieved without the use of an earth lead which may or may not be included in the electrical distribution system to which the circuit interrupter 1 is connected. Thus, the circuit interrupter 1 is suitable for use with double insulation equipment where an earth terminal may not be available. Tripping will not, however, occur if the line voltage drops or is absent. Reversal of the connections will be detected as an increase in the voltage of the neutral lead N, thus causing tripping of the circuit breaker. It will also be appreciated that the circuit interrupter of the invention is relatively simple to manufacture and is reliable in operation as it requires relatively few components.

It is envisaged that the circuit interrupter may also be used in a system having line, neutral and earth leads. It is not envisaged that any modification would be required to the circuit interrupter described above for such an application.

It is envisaged that the circuit interrupter of the invention may include only one fault detection circuit and associated tripping circuit. Further, the fault detection circuits may be of any desired type. It is not essential that a capacitor be used as a charge storage device for the closed loop and it is envisaged that a D.C. battery may be used. There may be a single switch for both earth leakage and loss of neutral tripping and possibly a single switch control circuit connected to both loss of neutral and earth leakage detection circuits.

It is envisaged that instead of using a single-pole circuit breaker, a double-pole breaker may be used, so that the effective line lead is tripped if the input terminals are reversed.

What is claimed is:

1. A circuit interrupter for use in an electrical power system having line and neutral leads connected between an energy source and a load, said circuit interrupter comprising:
    circuit breaker means for opening said line lead on activation thereof;
    fault detection circuit means for detection of a loss of neutral fault condition;
    tripping circuit means for activation of said circuit breaker means on detection of said loss of neutral fault, said tripping circuit means including:
    a D.C. power supply having an input connected to said line and neutral leads;
    a closed loop circuit including a charge storage device, a solenoid coupled to said circuit breaker means, and a switch, said charge storage device being connected across the output of said D.C. power supply;
    a switch control circuit, responsive to said fault detection circuit means, for driving said switch from a normally-open position to a closed position to allow discharge of said charge storage device through said solenoid for activation of said circuit breaker means; and
    a ground fault detection circuit having associated therewith a second control circuit and a second switch, said second switch being connected in parallel with said closed loop circuit switch.

2. The circuit interrupter of claim 1, wherein said fault detection circuit means includes a differential current transformer having a pair of opposed primary windings connected to said line and neutral leads and a secondary winding connected to said second control circuit.

3. The circuit interrupter of claim 2, wherein said fault detection circuit means comprises a pull-up resistor connected between said line and neutral leads and a magnetic field detector for detection of an electro-magnetic field generated around said neutral lead.

4. The circuit interrupter of claim 3, wherein said magnetic field detector comprises a hex inverter having a feed-back resistor for linear amplification of a detected magnetic field.

5. The circuit interrupter of claim 4, wherein said switch is a bipolar transistor, the base of which is connected to said hex inverter output.

6. The circuit interrupter of claim 1, wherein the charge storage device is a capacitor.

* * * * *